Patented Dec. 7, 1948

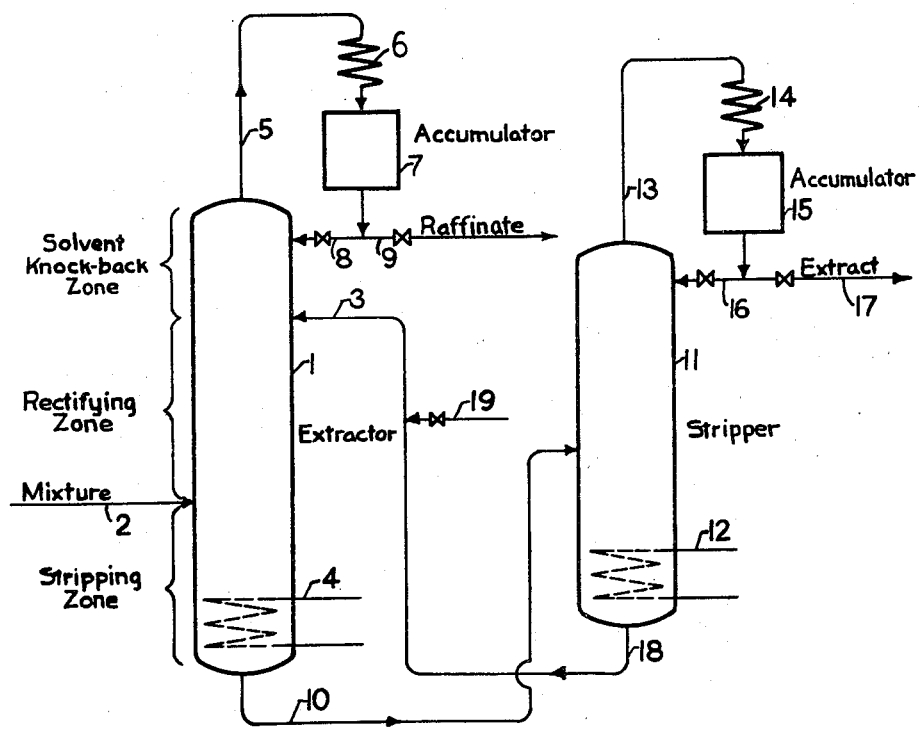

2,455,803

UNITED STATES PATENT OFFICE 2,455,803

EXTRACTIVE DISTILLATION PROCESS

Gino J. Pierotti, Albany, Calif., assignor to Shell Development Company, San Francisco, Calif., a corporation of Delaware Application February 11, 1944, Serial No. 522,206

5 Claims. (Cl. 202—39.5)

This invention relates to a process for separating vaporizable organic mixtures by extractive distillation with a solvent comprising (1) a selective solvent and (2) a mutual solvent for said selective solvent and said mixture. This application is a continuation-in-part of my copending application, Serial No. 475,213 filed February 8, 1943 now abandoned.

Extractive distillation calls for the employment of a vapor phase extractor comprising in a single column from top to bottom, a solvent knock-back zone, a rectifying zone, and a stripping zone, the latter being equipped with a reboiler (see drawing). During operation, a liquid selective solvent flows downward through the rectifying and stripping zones in countercurrent to the mixture to be separated. Naturally, it is desirable to employ a solvent of high selectivity. However, high selectivity in a solvent is frequently coupled with low solvent power, and if its power is low it tends to form two liquid layers in the extractor. This—I have found—results in poor extraction efficiency.

It is the broad purpose of this invention to maintain a single liquid phase between a selective solvent of low solvent power and the mixture to be separated in an extractive distillation column. Another purpose of this invention is to separate vaporizable organic mixtures economically, efficiently, and effectively by extractive distillation using a selective solvent of low solvent power. Specific purposes, among others, are to produce pure compounds, to desulfurize hydrocarbon mixtures, to dehydrate wet compounds, to separate components of constant boiling mixtures, or of mixtures having boiling points closer than say 10° C., or isomeric mixtures, or other mixtures of similar organic compounds having different degrees of saturation, or other mixtures otherwise difficultly separable. More specifically, a purpose of this invention is to produce pure compounds such as butadiene, toluene, xylenes, etc. from hydrocarbon mixtures containing them.

Generally, the process of this invention comprises the following steps: (A) Countercurrently contacting the mixture to be separated in the vapor state, that is, at a temperature above its bubble temperature, in a rectifying zone with a high boiling liquid solvent comprising a highly selective solvent and a mutual solvent, to produce a raffinate vapor which is removed, and a rich solvent. (B) The latter is then stripped in a stripping zone comprising a reboiler or similar piece of equipment, to drive out dissolved components of the mixture having the lower solubility in said solvent. The stripped rich solvent is the extract phase which consists essentially of the highly selective solvent, the mutual solvent, and the components of the mixture of relatively high solubility. Step (C) comprises separating the extract components from said selective solvent and mutual solvent by distillation or washing out. An optional step (D) comprises returning the two solvents to the extractor for further contact with more of said mixture. Additional steps of pre-fractionation of the mixture to be separated and of fractional distillation of the final product are usually employed in the production of pure products.

Before discussing the process in detail, the mixtures and solvents involved in the process will be more fully described.

THE MIXTURE TO BE SEPARATED

Many different types of mixtures of compounds may be separated by the extractive distillation, provided the mixtures are at least partially vaporizable at temperatures substantially below the boiling temperatures of the solvents and are inert toward them. Moreover, the presence of the solvents in the mixture must cause a greater change in the "escaping tendency" of one component of the mixture relative to that of the other components. By "escaping tendency" is meant the potential of one component to pass from one phase to another. The process may be used for the isolation of pure compounds, the separation of isomers, various purification processes such as desulfurization and dehydration, the separation of mixtures forming azeotropes or the separation of mixtures of organic compounds of different degrees of saturation, for instance the concentration of the different types of hydrocarbons in different fractions, examples being the separation of aromatics, acetylenes, poly olefins, olefins, naphthenes and paraffins from each other in various hydrocarbon mixtures containing them.

Some specific examples of mixtures which may be separated into two or more components by the selective solvents of this invention are narrow boiling mixtures containing two or more of the following hydrocarbons having the same number of carbon atoms but differing in the degrees of saturation: ethane, ethylene, acetylene, propane, propylene, allylene, methyl acetylene, normal and isobutane, normal, iso-, alpha, and beta-butylenes, butadienes, dimethyl acetylene, ethyl acetylene, vinyl acetylene, diacetylene, etc.; normal and isopentanes, normal and iso amylenes, isoprene, piperylene, n-propyl acetylene, isopropyl acetylene, methyl ethyl acetylene, cyclopentanes, cyclopentenes, and cyclopentadienes, etc.; normal and isohexanes, normal and iso hexylenes, hexadiene-1,5, methyl pentadiene-1,3, isobutyl acetylenes, diethyl acetylenes, di-propargyl, dimethyl di-acetylene, methyl cyclopentane, cyclohexane, cyclohexadiene, etc.; normal and iso heptanes, normal and iso heptylenes, etc.; normal and iso octanes, normal and iso-octylenes, di-isobutenyl, etc.; gasoline distillates containing benzene, toluene, xylenes, ethyl benzene, mesitylene, cumene, etc. togther with naphthenes or paraffins or both; chlorinated hydrocarbon mixtures, etc. Other mixtures which may be separated are those of organic substances containing water, such as aqueous alcohols including methyl, ethyl, propyl, etc. alcohols; or organic acids including formic, acetic propionic, etc. acids; or esters including methyl, ethyl, isopropyl, formate or acetate, etc. Still other mixtures are those of oxy organic compounds such as primary and secondary butyl alcohols; methyl propyl ketone and di-ethyl ketone; etc. Other organic mixtures are those produced in various industrial and chemical processes of the coal, lignite, and petroleum industries such as organic sulfur compounds, including mercaptans, mixtures of phenols and thio phenols, mono, di, and tri-methyl amines; isoprene and methyl formate; etc.

It may be noted that all of the above mixtures are at least partially soluble in the commonly known selective solvents such as furfural, phenol, etc. which have preferential solvent power for aromatic over paraffinic hydrocarbons.

THE SELECTIVE SOLVENT

The selective solvent should boil at at least 50° C. and preferably at more than 100° C. above the A. S. T. M. 90% boiling temperature and preferably above the end boiling point of the mixture to be separated. It must be sufficiently heat stable to at least partially vaporize without decomposition in the presence of the auxiliary solvent. Moreover, it should not crystallize out of solution at the highest concentration which may occur at any point in the process. It is desirable that it be not more than 50% by volume soluble in a kerosene having a Watson Characterization Factor of at least 12 (see Ind. and Eng. Chem., vol 27, p. 1460, December, 1935, "Characterization of Petroleum Fractions" by Watson, Nelson and Murphy). Higher solubility in such a kerosene frequently is an indication of poor selectivity.

It is understood that certain of the selective solvents produce two liquid phases in an extractive distillation column with some mixtures but not with others. Whether or not two liquid phases are formed can easily be tested in the laboratory.

It is understood that different mixtures may require different solvents. By way of example, some specific solvents which generally form two liquid phases with hydrocarbons are listed below, viz. sulfolane, methyl sulfolane, sulfolanol, dimethyl sulfone, ethylene glycol, diethylene glycol, higher poly ethylene glycols, glycerine, certain glyceryl mono ethers and esters, such as methyl, ethyl, propyl, butyl, amyl, hexyl, cyclohexyl, phenyl, tolyl, xylyl, decyl, hexadecyl, octadecyl, etc. glyceryl esters and ethers; dihydroxy diphenyl ether, glycerol chlorhydrin, mono, di and tri ethanol amines, amino diols such as amino propylene and amino butylene glycol, di-amino glycols such as di-amino propanol, di-amino butanol, etc.; and many others.

All of the above-mentioned selective solvents are miscible with water in all proportions, but not all highly sensitive solvents which are miscible with water form two liquid phases with hydrocarbons in extractive distillation.

THE MUTUAL SOLVENT

The selection of the mutual solvent depends upon the type of mixture to be separated and the selective solvent employed, in that its purpose is to produce a single liquid phase between them at their bubble temperature or under the conditions existing in an extractive distillation column. The boiling temperature of the mutual solvent must be sufficiently above the A. S. T. M. 90% boiling point of the mixture, so that it may be easily separated from the bulk of the mixture by ordinary fractional distillation and remain with the highly selective solvent. Thus it is desirable that the mutual solvent have a boiling point not less than 10° C. and preferably more than 40° C. higher than the A. S. T. M. 90% boiling temperature and preferably above the end boiling point of the mixture to be separated. In addition, the mutual solvent may decrease the boiling temperature of the highly selective solvent, thereby reducing the temperature in the extraction column and the danger of thermal decomposition of the highly selective solvent. The mutual solvent may chemically resemble very closely the component of the mixture extracted by the selective solvent, provided it meets the above requirements. In effect, the mutual solvent may be introduced as part of the mixture to be separated.

Some suitable mutual solvents which may be employed in the separation of hydrocarbon mixtures in conjunction with the highly selective solvents mentioned above are mono ketones, alcohols, and ethers containing from about 3 to 8 carbon atoms per molecule such as methyl ketone, diethyl ketone, methyl isobutyl ketone, diisobutyl ketone, cyclohexanone, n or isopropyl, butyl, amyl, hexyl, cyclohexyl, etc. alcohols, diethyl, dipropyl, methyl propyl, methyl butyl, etc. ethers; acetonitrile, lactonitrile, etc.; dioxane, pyridine, methyl pyridine, morpholine, aromatic hydrocarbons such as benzene, toluene, cumene, mesitylene, etc. and others.

As in the case of the selective solvents, some of these solvents may act as mutual solvents for some combinations and not for others. It is understood that the mutual solvent selected will have previously been tested in combination with the selective solvent and the mixture to be separated in order to determine its effectivness to insure a single liquid phase throughout the conditions existing in the extractive distillation.

THE PROCESS

The accompanying drawing illustrates a flow diagram of an extractive distillation process.

Referring to Figure 1 of the drawing, the feed mixture to be separated is introduced into column through line 2 where it countercurrently contacts a solution of a selective solvent and a mutual solvent introduced through line 3, at a temperature slightly above the bubble temperature of said mixture, to produce a raffinate vapor and a liquid extract phase. Column 1 may be a packed or bubble plate fractionating column and is provided at its bottom with reboiler 4 to vaporize the mixture and solvents, and at its top with a vapor line 5, condenser 6 and accumulator 7 to provide a reflux of the raffinate to the top of the column through valved line 8, and a raffinate product withdrawn through valved line 9. Column 1 has three zones, a solvent knockback zone above the solvent inlet 3, a rectifying zone between inlet 3 and feed line 2, and a stripping zone below feed line 2.

The extract phase, comprising the selective solvent, the mutual solvent, and the dissolved component of the mixture, is withdrawn from column 1 through bottom line 10 and is introduced into stripper 11 to remove said extract from the solvents. Stripper 11 is provided with reboiler 12 at its bottom, top vapor line 13, condenser 14, and accumulator 15 to provide a reflux of extract to the column through valved line 16 and an extract product withdrawn through valved line 17.

Recovered solvents are withdrawn from stripper 11 through bottom line 18 to join line 3 for recontact with more of said mixture in said extractor 1. Valved line 19 is provided for the addition of fresh solvents to the system as required.

This extractive distillation process may be carried out either adiabatically or isothermally.

The apparatus employed in this process may be in any conventional or convenient type known to those skilled in the art. The temperature for extractive distillation with a highly selective solvent and a mutual solvent generally may range within wide limits provided it is above the bubble temperature of the mixture and substantially below the boiling temperature of the solvents under the pressure and temperature conditions maintained in the extractor. Sub-atmospheric pressures may be resorted to in order to reduce the temperature if the mixture is not thermally stable at higher temperatures. Suitable temperatures may range from above about $-50°$ C. or the bubble temperature of the mixture (whichever is higher) up to about $+350°$ C. at pressures from about .1 p. s. i. absolute up to about 500 p. s. i. absolute.

The ratio of mutual solvent to highly selective solvent must be at least enough so that throughout the contact zone only one liquid phase will form under the conditions of the process or at the bubble temperature of the mixture to be separated. It preferably should not be greater than about 1:1 by volume, because excessive quantities of the mutual solvent normally tend to reduce the selectivity of the selective solvent.

Useful solvent-to-feed ratios may range from ½ to 25 by volume and usually they are not more than about 10 and preferably not more than about 5.

*Example I*

A mixture of toluene (boiling point 110.6° C.) and paraffins having a boiling range close to the boiling point of toluene was admixed in a vessel with 50% by weight of each of the selective solvents shown in the table below, both with and without mutual solvents. Each mixture was then heated at the boiling point until the vapor above the liquid was in equilibrium with the liquid. Then samples of vapor were separated, condensed, and tested to determine the percent of toluene in the vapor on basis free from all solvents. From these data the volatility ratio of toluene to paraffins in the presence of each solvent was calculated. The volatility ratio, often called the "alpha value," is the ratio of the percent of paraffins in the vapor to the percent of paraffins in the liquid, divided by the ratio of the percent of toluene in the vapor to the percent of toluene in the liquid. In comparison, the volatility ratio of toluene to paraffin in the mixture without the addition of a solvent is also shown. The alpha value is a direct measure of the selectivity of the solvent, and the greater this value the greater is the selectivity.

In the table below the essential data are summarized and for comparison the alpha values of two widely used common selective solvents are also shown.

| Selective Solvent | Wt. Per Cent on Whole Mix | Mutual Solvent | Wt. Per Cent on Whole Mix | Wt. Per Cent Toluene in— | | Alpha Value | No. of Liquid Phases at B. P. |
|---|---|---|---|---|---|---|---|
| | | | | Liquid | Vapor | | |
| None | | | | 50.0 | 43.1 | 1.32 | 1 |
| Methyl-3-sulfolane | 50 | None | | 50.0 | 32.6 | 2.07 | 2 |
| Do | 50 | Mesitylene | 7.5 | 50.0 | 29.9 | 2.58 | 1 |
| 2-4-dimethyl sulfolane | 50 | None | | 50.0 | 26.6 | 2.76 | 1 |
| Do | 50 | Cumene | 7.5 | 50.0 | 26.8 | 2.72 | 1 |
| Sulfolane | 50 | None | | 50.0 | 37.0 | 1.70 | 2 |
| Do | 50 | Cumene | 19.8 | 50.0 | 23.2 | 3.30 | 1 |
| Methyl-3-sulfolanyl ether | 50 | None | | 50.0 | 36.7 | 1.73 | 2 |
| Do | 50 | Cumene | 23.7 | 50.0 | 27.6 | 2.61 | 1 |
| Ethanol amine | 50 | None | 0 | 50.0 | 61.2 | 1.58 | 2 |
| Do | 26 | Ethyl carbitol | 24 | 50.0 | 70.3 | 2.43 | 1 |
| Ethyl carbitol | 50 | None | 0 | 50.0 | 64.9 | 1.85 | 1 |
| Do | 24 | None | 0 | 50.0 | 60.6 | 1.54 | 1 |
| Phenol | 50 | | | 50.0 | 32.3 | 2.10 | 1 |
| Aniline | 50 | | | 50.0 | 32.5 | 2.08 | 1 |

*Example II*

A mixture of equal weights of isoprene (boiling point 34° C.) and pentene-2 (boiling point 36.4° C.) was admixed in a vessel with different amounts by weight of each of the selective solvents shown in the table below, both with and without mutual solvents. Each mixture was then heated to its boiling point until the vapor above the liquid was in equilibrium with the liquid and then samples of the vapor were separated, condensed, and tested to determine the percent of isoprene in the vapor on a solvent-free basis. From these data, the volatility ratio of isoprene to pentene-2 in the presence of each solvent is calculated.

In the table below the essential data are summarized:

| Selective Solvent | Wt. per cent in final mixture | Mutual Solvent | Wt. per cent in final mixture | Wt. per cent of Pentene-2 in— Liquid | Vapor | "Alpha Value" | No. of liquid phases |
|---|---|---|---|---|---|---|---|
| None | | | | 50.0 | 49.0 | 0.98 | 1 |
| Methylsulfolane | 85 | None | | 50.0 | | [1] 1.15 | 2 |
| Do | 64 | Acetonitrile | 11 | 50.0 | | | 2 |
| Do | 72 | do | 13 | 50.0 | 67.9 | 1.56 | 1 |
| Do | 52 | Dioxane | 23 | 50.0 | 66.2 | 1.48 | 1 |
| Do | 35 | None | 0 | 50.0 | 50.7 | 1.03 | 2 |
| Sulfolane | 68 | Acetonitrile | 17 | 50.0 | | | 2 |
| Do | 38 | do | 37 | 50.0 | 67.8 | 1.55 | 1 |
| Do | 51 | Dioxane | 34 | 50.0 | 67.1 | 1.52 | 1 |
| Do | 68 | Acetone | 17 | 50.0 | 67.1 | 1.52 | 1 |
| Do | 72 | Methyl ethyl ketone | 13 | 50.0 | | | 2 |
| Do | 68 | do | 17 | 50.0 | 69.4 | 1.63 | 1 |
| Do | 68 | Methyl isobutyl ketone | 17 | 50.0 | 67.9 | 1.56 | 1 |
| Do | 60 | Isopropyl alcohol | 25 | 50.0 | 67.1 | 1.52 | 1 |
| Do | 72 | Pyridine | 13 | 50.0 | | | 2 |
| Do | 60 | do | 25 | 50.0 | 68.7 | 1.60 | 1 |
| Do | 68 | Secondary butyl alcohol | 17 | 50.0 | 70.6 | 1.70 | 1 |

[1] Estimated value within ±.1 of correct "Alpha Value."

I claim as my invention:

1. In an extractive distillation process for the separation of a vaporizable organic mixture comprising predominantly aromatic hydrocarbons and non-aromatic hydrocarbons of similar boiling range with a sulfolane selective solvent therefor, wherein said selective solvent forms two liquid phases under the conditions of the process, the improvement comprising adding to said sulfolane solvent from an extraneous source a mutual solvent which is an aromatic hydrocarbon for said selective solvent and said mixture in amounts corresponding to a mutual solvent-to-sulfolane volume ratio not greater than about unity and sufficient to produce a single liquid phase under the conditions of the process, whereby the efficiency of the extractive distillation is improved, both said solvents having boiling temperatures above the A. S. T. M. 90% boiling temperature of said organic mixture and sufficiently higher whereby separation of the solvents together from the resulting extracted portion of the mixture may be readily effected by distillation.

2. In an extractive distillation process for the separation of an organic mixture comprising predominantly toluene and paraffinic hydrocarbons having a boiling range close to the boiling point of toluene with a sulfolane selective solvent therefor, wherein said selective solvent forms two liquid phases under the conditions of the process, the improvement comprising adding to said sulfolane solvent from an extraneous source a mutual solvent which is an aromatic hydrocarbon for said selective solvent and said mixture in amounts corresponding to a mutual solvent-to-sulfolane volume ratio not greater than about unity and sufficient to produce a single liquid phase under the conditions of the process, whereby the efficiency of the extractive distillation is improved, both said solvents having boiling temperatures above the A. S. T. M. 90% boiling temperature of said organic mixture and sufficiently higher whereby separation of the solvents together from the resulting extracted portion of the mixture may be readily effected by distillation.

3. In an extractive distillation process for the separation of an organic mixture comprising predominantly toluene and non-aromatic hydrocarbons having a boiling range close to the boiling point of toluene with a sulfolane selective solvent therefor, wherein said selective solvent forms two liquid phases under the conditions of the process, the improvement comprising adding cumene to said sulfolane solvent from an extraneous source as a mutual solvent for said selective solvent and said mixture in amounts corresponding to a mutual solvent-to-sulfolane volume ratio not greater than about unity and sufficient to produce a single liquid phase under the conditions of the process, whereby the efficiency of the extractive distillation is improved.

4. In an extractive distillation process for the separation of an organic mixture comprising predominantly toluene and non-aromatic hydrocarbons having a boiling range close to the boiling point of toluene with a sulfolane selective solvent therefor, wherein said selective solvent forms two liquid phases under the conditions of the process, the improvement comprising adding mesitylene to said sulfolane solvent from an extraneous source as a mutual solvent for said selective solvent and said mixture in amounts corresponding to a mutual solvent-to-sulfolane volume ratio not greater than about unity and sufficient to produce a single liquid phase under the conditions of the process, whereby the efficiency of the extractive distillation is improved.

5. In an extractive distillation process for the separation of an organic mixture comprising predominantly toluene and non-aromatic hydrocarbons having a boiling range close to the boiling point of toluene with sulfolane under conditions which normally form two liquid phases, the improvement comprising adding cumene to said sulfolane from an extraneous source as a mutual solvent for said sulfolane and said mixture in amounts corresponding to a mutual solvent-to-sulfolane volume ratio not greater than about unity and sufficient to produce a single liquid phase under the conditions of the process, whereby the efficiency of the extractive distillation is improved.

GINO J. PIEROTTI.

REFERENCES CITED

The following references are of record in the file of this patent:

UNITED STATES PATENTS

| Number | Name | Date |
|---|---|---|
| 1,474,216 | Van Ruymbeke | Nov. 13, 1923 |
| 2,162,963 | McKittrick | June 20, 1939 |
| 2,290,636 | Deanesly | July 21, 1942 |
| 2,325,329 | Durrum | July 27, 1943 |
| 2,350,584 | Buell | June 6, 1944 |

(Other references on following page)

UNITED STATES PATENTS

| Number | Name | Date |
|---|---|---|
| 2,357,028 | Sluras | Aug. 29, 1944 |
| 2,360,859 | Evans | Oct. 24, 1944 |
| 2,360,861 | Pierotti et al. | Oct. 24, 1944 |
| 2,366,360 | Semon | Jan. 2, 1945 |
| 2,396,302 | Cummings et al. | Mar. 12, 1946 |
| 2,434,796 | Hackmuth | Jan. 20, 1948 |

OTHER REFERENCES

Moor et al., "Extraction of 1,3 Butadine from Cracked Gases. II, Comparative Solubilities of 1,3 Butadiene and Butenes" Transactions of the Research Plant "Khimgas" Materials on Cracking and Chemical Treatment of Cracked Products, vol. 2, Leningrad 1935, vol. 3, Leningrad 1935, pages 157–164. Universal Oil Products Survey of Foreign Petroleum Literature Translation S–153, Feb. 6, 1942 (7 pages); abstracted in Chemical Abstracts, vol. 29, page 6034. Copies of original article, translation and abstract in Scientific Library, 183–115.6.

Moor, Chemical Abstracts, vol. 29, (1935) page 6034.